United States Patent [19]  
Eisenberg

[11] 4,136,233  
[45] Jan. 23, 1979

[54] CHALCOGENIDE BATTERY
[75] Inventor: Morris Eisenberg, Mountain View, Calif.
[73] Assignee: Electrochimica Corporation, Mountain View, Calif.
[21] Appl. No.: 872,226
[22] Filed: Jan. 25, 1978
[51] Int. Cl.$^2$ ............................................. H01M 6/36
[52] U.S. Cl. ................................... 429/112; 429/191; 429/197; 429/218
[58] Field of Search .............. 429/112, 191, 197, 218, 429/220, 221, 194, 224

[56] References Cited
U.S. PATENT DOCUMENTS

| | | | |
|---|---|---|---|
| 3,816,179 | 6/1974 | Lotgering et al. | 429/191 |
| 4,009,052 | 2/1977 | Whittingham | 429/191 |
| 4,049,879 | 9/1977 | Thompson et al. | 429/191 |
| 4,049,887 | 9/1977 | Whittingham | 429/112 |
| 4,075,397 | 2/1978 | Francis et al. | 429/191 X |

Primary Examiner—Charles F. LeFevour  
Attorney, Agent, or Firm—Robert B. Kennedy

[57] ABSTRACT

A battery comprising an anode having an anode-active metal selected from the group consisting of Group Ia metals, Group Ib metals, Group IIa metals, Group IIb metals, Group IIIa metals and mixtures thereof. The cathode has a cathode-active material consisting essentially of a chalco-spinel of the formula $M_aN_bZ_x$ wherein M is a divalent ion selected from the group of metals consisting of copper, zinc, cadmium, iron, cobalt, nickel, manganese, molybedenum, vanadium and chromium, N is a trivalent ion selected from the group of metals consisting of iron, cobalt and nickel and metals of Group IVb, Vb, and VIIb of the periodic system, Z is an element selected from the group consisting of sulfur, selenium and tellurium, a is a numerical value between 0.90 and 1.10, b is a numerical value between 1.80 and 2.20 and x is a numerical value between 3.80 and 4.20.

19 Claims, No Drawings

CHALCOGENIDE BATTERY

BACKGROUND OF THE INVENTION

This invention relates generally to electrochemical batteries, and specifically to high energy electrochemical cells or batteries of the type which employ active metals of groups Ia, IIa and IIIa of the periodic system of the elements.

Heretofore, there have been a number of battery developments utilizing chalcogenide compounds as cathode materials. Exemplary of these prior art batteries are those disclosed in U.S. Pat. Nos. 3,791,867 and 4,000,052 wherein single metal intercalatable dichalcogenides of a layered structure are employed. It has now been discovered that another type of chalcogenide, specifically chalcospinels involving two metals in the form of divalent and trivalent metal ions, may also be utilized as cathode materials with suprisingly good performance. Compounds of sulfur, selenium and tellurium, which ordinarily have cubic face centered structures, have been found to possess the remarkable capability of providing stable and rechargeable cathode materials in the operation of batteries with high faradaic yield per unit weight. Basically, the compounds involve one divalent ion and two trivalent ions of transition metals and four ions of the chalcogen sulfur, selenium or tellurium. Preferred examples of sulfides are $CuCo_2S_4$ and $CoTi_2S_4$. Preferred selenides include $CuCr_2Se_4$ and $CoTiSe_4$. Useful high energy batteries have been prepared in accordance with the present invention utilizing cathodes containing as the sole cathode-active material one or more compounds selected from this group of chalcogen spinels.

SUMMARY OF THE INVENTION

In a preferred form of the invention a battery is provided which comprises an anode having an anode-active metal selected from Group Ia metals, Group Ib metals, Group IIa metals, Group IIb metals, Group IIIa metals and mixtures thereof. The battery cathode has a cathode-active material consisting essentially of a chalcospinel of the formula $M_aN_bZ_x$ wherein M is a divalent ion selected from the group of metals consisting of copper, zinc, cadmium, iron, cobalt, nickel, manganese, molybdenum, vanadium and chromium, N is a trivalent ion selected from the group of metals consisting of iron, cobalt and nickel and metals of Group IVb, Group Vb, and Group VIb of the periodic system, Z is an element selected from the group consisting of sulfur, selenium and tellurium, a is a numerical value between 0.90 and 1.10, b is a numerical value between 1.80 and 2.20 and x is a numerical value between 3.80 and 4.20. The battery also has an electrolyte that is substantially chemically inert with respect to the anode-active metal and the cathode-active material through which ions may migrate from the anode towards the cathode.

DESCRIPTION OF THE PREFERRED EMBODIMENTS

In the actual preparation of cathode plates conventional methods are used in which conductive additives such as metal powders, graphics and carbon are employed together with a polymeric binder such as TFE. Typically, from 2% to 30% by weight of additives is employed. The cathodes are readily fabricated by pressing an additive mix to a support structure such as nickel or copper wire mesh.

As previously stated, the anode contains as the anode-active material a metal selected from the group consisting of Group Ia metals, Group Ib metals, Group IIa metals, Group IIb metals, Group IIIa metals and mixtures thereof. Preferably, the anode-active material is magnesium, calcium, zinc, potassium, sodium, or lithium with lithium being the most preferred. In this application borom is not regarded as a metal having utility as an anode-active material. The anode is fabricated in the conventional manners by attaching the active material to a supporting grid structure made of materials such an aluminum or nickel.

The electrolyte selected should be chemically inert to both the anode and the cathode while nevertheless containing ions which preferably are positive metal ions of the same type as the active-anode material. For example, where lithium anode is employed the electrolyte should preferably contain $Li^+$. Useful electrolyte materials include salts such as $LiCLO_4$, $LiBF_4$, $LiPF_6$, $LiAsF_6$, $KAsF_6$, KCNS and LiCNS. The electrolyte may be in a pure state in the form of a solid, fused solid, such as a molten salt, or a liquid. Alternatively, it may be dissolved in a suitable solvent such as ethers, esters, organic carbonates, organic lactones, organic nitriles, nitrohydrocarbons, organic sulfoxides and mixtures thereof. The following illustrate batteries constructed in accordance with principles of the invention.

EXAMPLE I 2.7g(grams) of the sulfospinel $CuCo_2S_4$ is mixed with 0.3g graphite and 0.2g of teflon binder (PTFE). The mixture is hot pressed to a 20 mesh nickel screen at 200° C. and 4 tons per square inch pressure. A resulting 1.5 × 2.0 inch sized cathode is assembled with a lithium anode of the same size using two layers of a non-woven polypropylene separator. The combination is rolled into a coil and placed in a round, one inch diameter can and filled with an electrolyte consisting of a 1.5 molar solution of $LiCLO_4$ in 70% tetrahydrofuran (THF) and 30% dimethoxyethane (DME) solvent mixture and sealed. Such a cell has been constructed and discharged at 80 mA for 5.7 hours and found to deliver 456 mA-H thus yielding 170 mA-H per gram of active material to a voltage cut-off of 1.35 volts.

EXAMPLE II 2.6 gram of $CoTi_2S_4$ is mixed with the same additives as in example 1 and similar cells prepared and filed with the same electrolyte. Such cells were discharged at 64 mA-H for 7.3 hours delivering 475 mA-H for a yield of 182 mA-H per gram of active material to a voltage cut-off of 1.25 volts.

EXAMPLE III

A sulfosinel type compound, meaning a chalcogen in which sulfur is employed, was prepared with nominal composition $Cu_{1.1}Fe_{2.1}S_{4.2}$ employed in a quantity of 2.5 grams as an example 1 in a cell using the same electrolyte. This cell was discharged at 70 mA for 8 hours and yielded 227 mA-H per gram of active material to a 1.20 volt cut-off point.

EXAMPLE IV

A sulfosinel cathode material with a nominal composition $Co_{0.95}Cr_{2.1}S_{4.1}$ was employed in a quantity of 2.65g as in the previous example. The cell was discharged at 80 mA for 7½ hours to 1.20 voltage cut-off thereby yielding 198 mA-H per gram.

EXAMPLE V

A cathode prepared using 2.7g of the sulfospinel $CuCr_2S_4$ as in the previous example was discharged at two current levels. First the cell was discharged for 4 hours at 100 mA and then 2.3 hours at 50 mA to a 1.10 voltage cut-off. The total capacity 515 mA-H corresponded to a yield of 191 mA-H per gram.

EXAMPLE VI

A cathode material was prepared from vanadium, titanium and sulfur in accordance with the formula $VTi_2S_4$. 2.4g of the active material was used to prepare and test a cell in accordance with the previous examples. The cell was discharged at 80 mA for 6.2 hours to an end voltage of 1.40 volts. This result corresponds to a yield of 206 mA-H per gram.

In some cases yields as high as 500 to 600 mA-H per gram have been obtained utilizing batteries of the type discovered and hereinabove described. However, it has been found that for long range battery performance it is not desirable to discharge to such an extent. This is believed attributable to the fact that rechargeablity cycling is better preserved if the initial discharge is not conducted to deeply. Capacity yield of 150 to 200 mA-H per gram have been found to be conducive to preserving rechargeability upon cycling.

It should be understood that the just described embodiments merely illustrate principles of the invention in selected, preferred forms. Many modifications additions and deletions may, of course, be made thereto without departure from the spirit and scope of the invention as set forth in the following claims.

I claim:
1. A battery comprising:
   (a) An anode having an anode-active metal selected from the group consisting of Group Ia metals, Group IIa metals, Group IIb metals, Group IIIa metals, and mixtures thereof;
   (b) a cathode having a cathode-active material consisting essentially of a chalco-spinel of the formula $M_aN_bZ_x$ wherein M is a divalent ion selected from the group of metals consisting of copper, zinc, cadmium, iron, cobalt, nickel, manganese, molybdenum, vanadium and chromium, N is a trivalent ion selected from the group of metals consisting of iron, cobalt and nickel and metals of Group IVb, Group Vb, and Group VIb of the periodic system, Z is an element selected from the group consisting of sulfur and selenium, a is a numerical value between 0.90 and 1.10, b is a numerical value between 1.80 and 2.20, and x is a numerical value between 3.80 and 4.20; and
   (c) an electrolyte which is substantially chemically inert with respect to said anode-active metal and said cathode-active material through which ions may migrate from said anode to said cathode.

2. A battery in accordance with claim 1 wherein said anode-active metal is selected from the group consisting of magnesium, calcium and zinc.

3. A battery in accordance with claim 2 wherein said anode-active metal is lithium.

4. A battery in accordance with claim 1 wherein M is a divalent ion of a metal selected from the group consisting of copper, iron, cobalt, nickel, molybdenum, vanadium and chromium, and wherein N is a trivalent ion selected from the group of metals consisting of iron, cobalt, nickel, titanium, vanadium, columbium, tantalum, chromium, molybdenum and tungsten.

5. A battery in accordance with claim 1 wherein Z is sulfur.

6. A battery in accordance with claim 1 wherein a is between 0.95 and 1.05, b is between 1.95 and 2.05 and x is between 3.90 and 4.10.

7. A battery in accordance with claim 1 wherein said chalco-spinel is $CuCo_2S_4$.

8. A battery in accordance with claim 1 wherein said chalco-spinel is $CoTi_2S_4$.

9. A battery in accordance with claim 1 wherein said chalco-spinel is $CuFe_2S_4$.

10. A battery in accordance with claim 1 wherein said chalco-spinel is $CoCr_2S_4$.

11. A battery in accordance with claim 1 wherein said chalco-spinel is $MoTi_2S_4$.

12. A battery in accordance with claim 1 wherein said chalco-spinel is $V Ti_2S_4$.

13. A battery in accordance with claim 1 wherein said chalco-spinel is $CuCr_2S_4$.

14. A battery in accordance with claim 1 wherein said chalco-spinel is $NiCr_2S_4$.

15. A battery in accordance with claim 1 wherein said electrolyte comprises a Group Ia inorganic metal salt dissolved in an organic solvent chemically inert with respect to said anode and said cathode.

16. A battery in accordance with claim 15 wherein said electrolyte consists essentially of lithium perchlorate and a mixture of tetrahydrofuran and dimethoxyethane.

17. A battery in accordance with claim 15 wherein said electrolyte comprises lithium perchlorate and 1,3-dioxolane.

18. A battery in accordance with claim 1 in which the electrolyte is a molten salt.

19. A battery in accordance with claim 1 wherein said electrolyte is a solid.

* * * * *